(No Model.)  3 Sheets—Sheet 1.

W. C. & F. E. WELLS.
MACHINE FOR MAKING NIPPLES AND STUD BOLTS.

No. 581,187.  Patented Apr. 20, 1897.

Witnesses.
Geo. W. Rea.
Robert Bennett

Inventors.
Willett C. Wells.
Frank E. Wells.
By James L. Norris
Atty.

THE NORRIS PETERS CO., PHOTO-LITHO., WASHINGTON, D. C.

(No Model.) 3 Sheets—Sheet 2.
W. C. & F. E. WELLS.
MACHINE FOR MAKING NIPPLES AND STUD BOLTS.
No. 581,187. Patented Apr. 20, 1897.
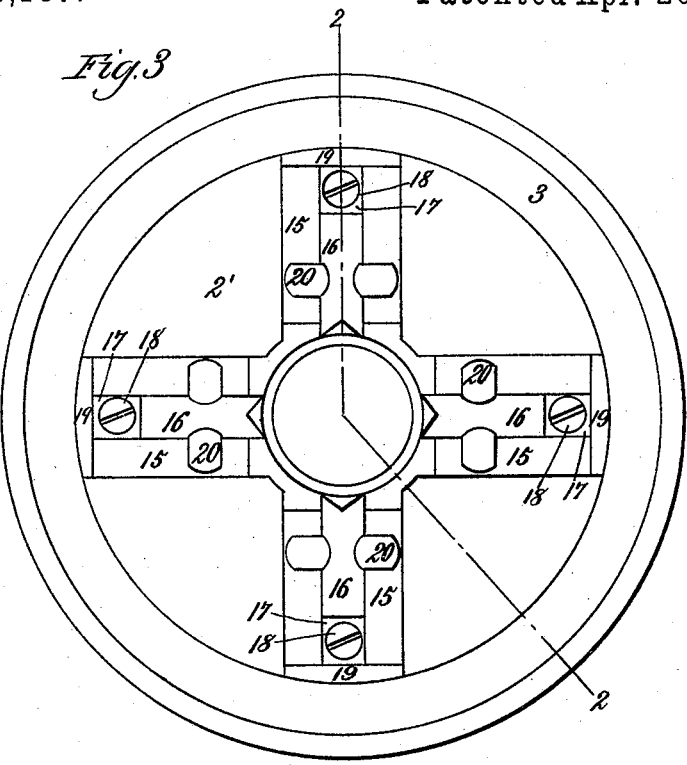
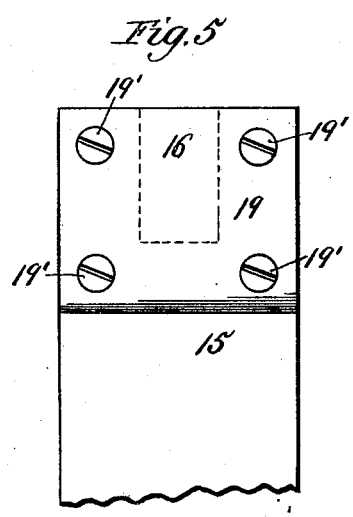
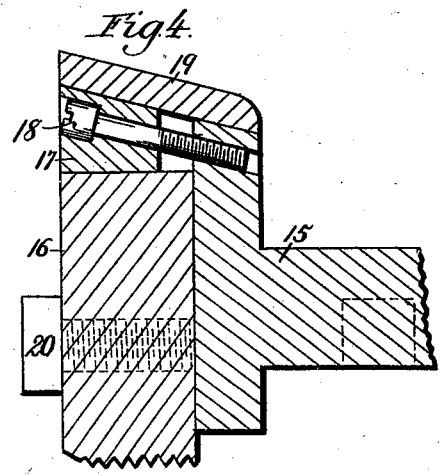
Witnesses.
Geo. W. Rea.
Robert Gorsett
Inventors.
Willett C. Wells.
Frank E. Wells.
By James L. Norris.
Atty.

(No Model.) 3 Sheets—Sheet 3.
W. C. & F. E. WELLS.
MACHINE FOR MAKING NIPPLES AND STUD BOLTS.
No. 581,187. Patented Apr. 20, 1897.
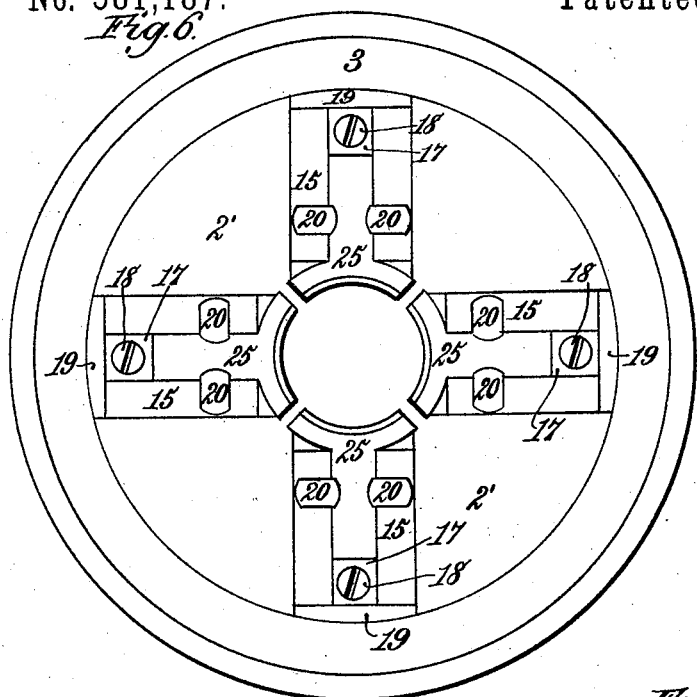
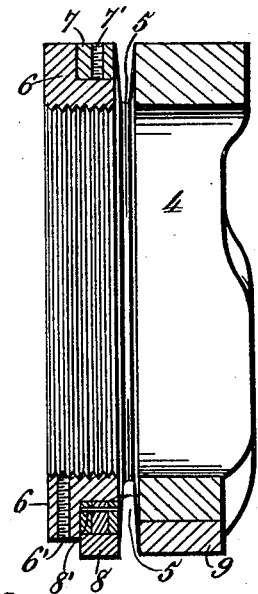
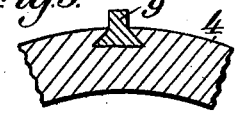
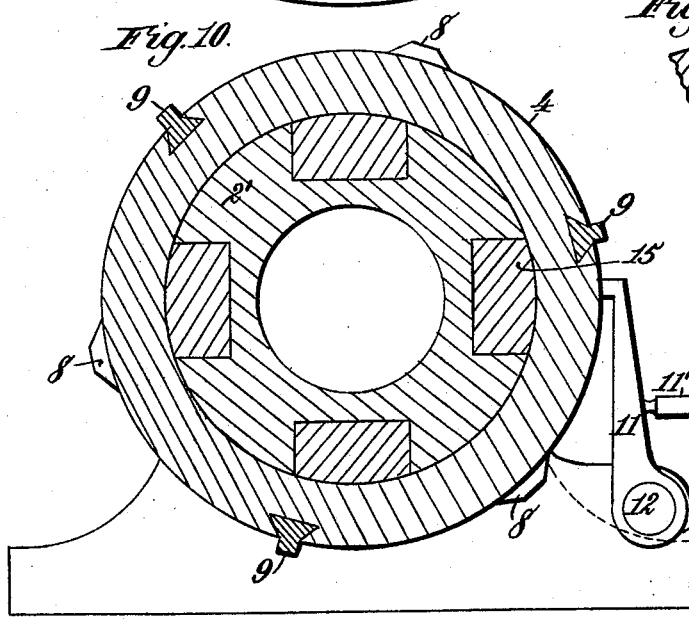
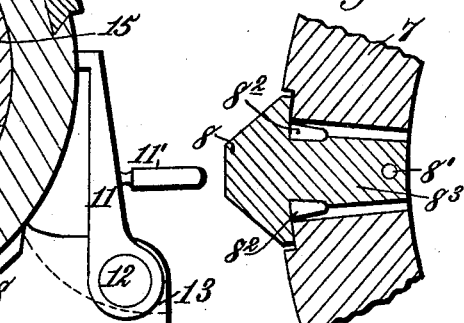
Witnesses.
Geo. W. Rea
Robert Cowett
Inventors.
Willett C. Wells.
Frank E. Wells.
By James L. Norris
Atty.
THE NORRIS PETERS CO., PHOTO-LITHO., WASHINGTON, D. C.

United States Patent Office.

WILLET C. WELLS AND FRANK E. WELLS, OF FOSTORIA, OHIO.

MACHINE FOR MAKING NIPPLES AND STUD-BOLTS.

SPECIFICATION forming part of Letters Patent No. 581,187, dated April 20, 1897.

Application filed January 31, 1896. Serial No. 577,616. (No model.)

*To all whom it may concern:*

Be it known that we, WILLET C. WELLS and FRANK E. WELLS, citizens of the United States, residing at Fostoria, in the county of Seneca and State of Ohio, have invented new and useful Improvements in Machines for Making Nipples and Stud-Bolts, of which the following is a specification.

This invention relates to machines for making nipples and stud-bolts, and has for its object to provide an improved chuck for grasping and rotating the pipe or rod to be operated upon, and which is also adapted for holding and rotating threading-dies when the stock is held and advanced to the dies by other means, the latter feature being particularly useful in threading bolts.

Our device is adapted to be attached to and operated with any lathe-bed or to be a part of a machine specially devised for the purpose named.

To these ends our invention consists in the features and in the construction, combination, or arrangement of parts hereinafter described, and pointed out in the claims following the description, reference being had to the drawings forming part of this specification, wherein—

Figure 1:
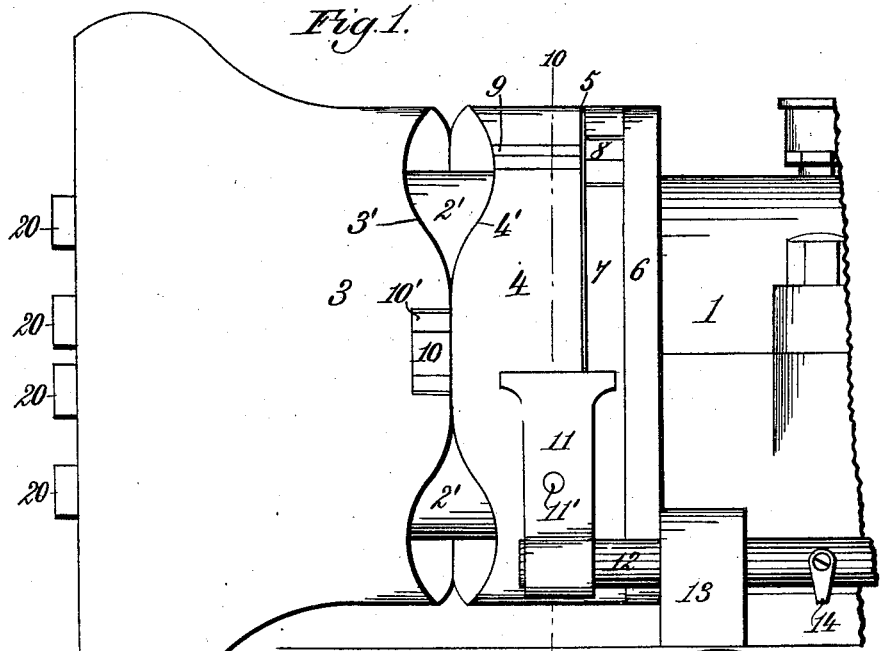
Figure 2:
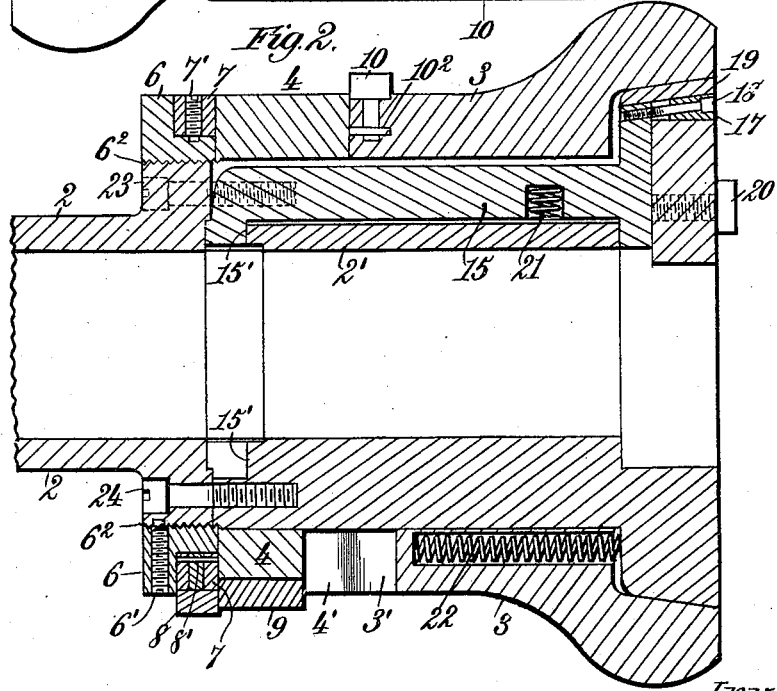

Figure 1 is a side elevation of our improved chuck, showing the journal-box partly broken away, which rests upon and is attached to the bed of the machine. Fig. 2 is a section of the chuck on the line 2 2 in Fig. 3. Fig. 3 is a face view of the chuck when provided with grippers. Fig. 4 is an enlarged section of the gripper-arm, the rear part being broken away, showing the wedge and screw device for adjusting the chasers or grippers. Fig. 5 is a top or outside view of the gripper-arm, the rear part being broken away. Fig. 6 is a face view of the chuck when provided with threading-grippers. Fig. 7 is a horizontal section of the cam-ring 4 and the collars 6 and 7. Fig. 8 is a section of collar 7, showing the construction and adjustment of the beveled lugs. Fig. 9 is a section of the cam-ring 4, showing the method of inserting the square lugs 9. Fig. 10 is a vertical section taken on the line 10 10 of Fig. 1.

Similar figures refer to similar parts throughout the several views.

In a machine in which our present invention is adapted to be used a hollow shaft is provided, to rotate in journals resting upon and attached to the bed of the machine, and our device is mounted upon the end of the shaft, as hereinafter shown. The pipe or rod from which nipples or bolts are to be made is fed through the shaft into the chuck, which, when the pipe or rod is in proper adjustment, grasps and rotates it axially. As this rotation proceeds the threading-dies and cut-off knife are advanced and thread the end of the tube or rod and then cut off the nipple or bolt and are retracted.

The construction of the device for advancing the dies and knife form the subject-matter of a separate application for Letters Patent filed on even date with the present application and need not, therefore, be described herein.

In order to enable those skilled in the art to make and use our improved chuck, we will now proceed to describe the same in detail.

We will first describe the chuck as being provided with grippers, the threading-dies being in the other part of the machine, as above stated.

Referring to the drawings, the reference-numeral 1 indicates the journal-box, which is mounted upon the bed of the machine and in which is journaled the hollow shaft 2, to which the chuck is attached. The shaft 2 in practice is rotated by a stepped cone-pulley provided with internal compound planetary gears for furnishing variable motion. The end of the shaft is enlarged and externally screw-threaded, as at $6^2$, Fig. 2. Screwed upon this threaded portion is a collar 6, which after having been properly adjusted upon the shaft is locked thereon by the set-screw 6'. The collar is reduced at its inner end, and upon the reduced portion is fitted a collar 7, adapted to be axially adjusted thereon for the purpose hereinafter shown, and when so adjusted is locked in position on the collar 6 by the set-screw 7'. Adjacent to the end of the shaft is a cylinder 2', having the same inner diameter as the shaft and the same outer diameter as the enlargement of the shaft at $6^2$. At its outer end the cylinder is enlarged and beveled to correspond to the inner diameter of the sleeve 3 at its outer end. The cylinder is provided with a series of radial longitudinal grooves, in which are arranged gripping-jaws 15, which at their rear ends are bent at right angles and inserted in slots 15', which they are formed to fit loosely and from which when the cylinder is brought to contact with the end of the shaft they cannot be withdrawn nor have any appreciable longitudinal motion, at the same time affording opportunity for the vertical motion of the jaws.

When the jaws are inserted, as explained, the cylinder is attached to and made rigid with the shaft and becomes, practically, an extension thereof by means of the screws 23 and 24.

The outer ends of the jaws (shown in section in Fig. 4) are bifurcated, in which bifurcated ends are secured the grippers or dies 16, as the case may be, which project radially inward and are held in place by the heads of bolts 20, which are tapped into the end of the jaw on each side of the gripper or die. The grippers are provided with serrated edges to grasp and hold the pipe or rod, and dies having chasers for cutting threads may be substituted for said grippers. Covering the outward radial end of each bifurcation is attached by screws 19' a hardened-metal plate 19, so fitted and adjusted as to have an inward bevel corresponding to the bevel on the cylinder 2'. Within the bifurcated end of the jaws between the grippers 16 and the plate 19 is arranged a wedge 17, which is advanced and retracted by the screw 18. This device serves to properly adjust the grippers.

The inner faces of the jaws 15 are provided with recesses, in which are arranged coiled springs 21, that bear against the cylinder and operate to throw said jaws and the grippers carried thereby radially outward.

Over the jaws and cylinder described is placed a sleeve 3, the outer end of which is internally beveled to correspond to the beveled ends of the jaws and the cylinder, as clearly appears in Fig. 2. The opposite end of sleeve 3 is provided with a cam-face 3', consisting of alternate raised and depressed portions, as most clearly shown in Fig. 1, and said sleeve is free to slide back and forth on the cylinder 2', but is splined on said cylinder, whereby it is prevented from having any rotary motion thereon. It will be manifest that when the sleeve 3 is moved outward or toward the left, as shown in Fig. 1, its beveled end will act against the beveled ends of the jaws 15 and force the latter with the grippers 16 inward to grasp the tube, and that when the sleeve is moved by the springs 22 in the reverse direction the jaws will open or will be thrown outward by the springs 21 and cause the grippers to release the pipe. The springs 22 are arranged in longitudinal apertures bored into the sleeve, one end of the spring bearing against the sleeve 3 at the inner end of said aperture and the other end bearing against the enlarged portion of the cylinder 2'.

Journaled upon the cylinder 2' immediately in the rear of the sleeve 3 is a cam-ring 4, having a cam-face 4' adjacent to the cam-face of sleeve 3 and corresponding thereto. Cam-ring 4 works against a spring 5 or other elastic washer arranged between the collars 6 and 7, above described, which causes the sleeve to exert a yielding pressure upon the grippers.

It will be readily understood that when the cam-ring 4 is brought into proper position to cause the elevated or projecting portions of its cam-face to abut against the corresponding elevated or projecting portions of the cam-face of the sleeve 3 the sleeve will be moved forward and force the jaws carrying the grippers inward in the manner before described, and when the cam-ring is brought into position to cause the elevated or projecting portions of one of the cam-faces to rest within the recessed portions of the adjacent cam-face the springs 22 will retract the sleeve and the jaws 15 will be opened by the springs 21, thus releasing the grippers.

The cam-ring 4 is brought into the described positions relative to the cam-face of the sleeve by the following means:

Formed on or secured to the periphery of cam-ring 4 are a series of rectangular projections or lugs 9, three being a convenient number, said projections being arranged opposite the center of the depressed portions of the cam-face, and upon the periphery of the sleeve 3 at its rear end are arranged a corresponding number of projections 10, having opposite beveled edges 10'. The projections 10 are arranged upon the elevated or projecting portions of the cam-face of the sleeve in such a manner that when the sleeve is retracted the projections 9 and 10 will be in alinement or register with each other. Projections 8 with opposite beveled edges similar to projections 10 are arranged upon the collar 7. A pawl 11 is mounted on a shaft 12, which is journaled in a box 13, attached to the bed. The pawl 11 is provided with a handle 11' and is adapted to be moved to the right or left to cause it to simultaneously engage the lugs 8 and 9 or 9 and 10. When the pawl is moved, the shaft 12 slides through the box 13. The shaft 12 is provided with a spring 14, which acts against the frame of the machine and serves to hold the pawl in contact with cam-ring 4.

When the machine is in operation, the collar 7, carrying lugs 8, and the sleeve 3, carrying lugs 10, rotate positively with the shaft 2 and cylinder 2', while the cam-ring 4 rotates with said cylinder solely on account of friction. If the pawl 11 be moved to the right, as shown in Fig. 1, it engages one of the lugs 9 and holds the cam-ring 4 against rotation, whereupon the cam-face on the ring, as the sleeve 3 rotates, acts upon the cam-face of the sleeve 3 and moves said sleeve forward and closes the grippers in the manner before described. During this time one of the lugs 8 on collar 7 has been brought into coincidence with lug 9, and at the moment the grippers close upon the pipe the beveled lug 8 raises the pawl out of engagement with lug 9 and causes it to ride idly over it. The pawl is caused to ride in like manner over each of the succeeding lugs and continues to ride over them until it is moved to the left. When the pawl is moved to the left, it is taken out of the path of lug 8 and rests upon the periphery of the cam-ring 4 and again engages one of the lugs 9 and arrests the rotary movement of the cam-ring until by the rotation of sleeve 3 the projections of its cam-face fall into the depressions in the cam-face of ring 4 and the sleeve is retracted by spring 22 and the grippers are released. At the moment the grippers are released one of the beveled lugs 10 on the sleeve registers with lug 9 and is engaged by the pawl and the latter is again lifted out of engagement with and rides over each of the lugs 9 and continues to do so until the pawl is again moved to the right to close the grippers. In order that the beveled projections 8 and 10 may completely cover lugs 9 when the pawl is riding idly over them and insure clearance of them by the pawl, the lugs 8 are provided with shanks $8^3$, Fig. 8, which are arranged in recesses in the collar 7 and sleeve 3. The recesses are slightly wider than the shanks, so that the lugs may have a slight oscillation therein. The shanks are recessed upon their opposite sides for the reception of U-shaped springs $8^2$, which also have a bearing against the sides of the recess in the collar or cam-ring. These springs hold the lug in a central position when the pawl is riding idly over the lugs; but when the lug acts to lift the pawl out of engagement with the lugs on the cam-ring 4 the force required is sufficient to overcome the force of spring $8^2$, which is opposed to the lug 9, and lug 8 or 10 is oscillated against the shoulder in the collar 7, adjacent to the spring. We show two springs and shoulders whereby the action of the pawl is the same whether the cam-ring revolves one way or the other in unison with cylinder $2'$, which may be rotated in either direction to cut right or left screwthreads.

Thus far we have described our invention as a chuck for gripping and revolving the pipe or rod. By substituting chasers for grippers, as shown in Fig. 4, and providing the machine with a vise to hold the rod, and by moving the rod upon the bed-feed into the face of the chuck, it is equally useful for thread-cutting as for the gripping and rotating described.

Having described our invention, what we claim is—

1. In a machine of the class described the combination with a hollow shaft, of jaws 15 connected at their inner ends to said shaft and having beveled outer ends, a sliding sleeve 3 arranged over said jaws and correspondingly beveled upon its interior and provided at its rear end with a cam-face $3'$, a cam-ring 4 journaled on said shaft, but held against endwise movement thereon and provided with a cam-face $4'$ corresponding to the cam-face on the sleeve 3, and means for arresting the rotation of said cam-ring.

2. In a machine of the character described, the combination with a hollow shaft, of jaws 15 connected at their inner ends to said shaft and having beveled outer ends, springs 21 operating to throw said jaws outward, a sliding sleeve 3 splined on said shaft over the jaws and beveled on its interior to correspond to the beveled ends of the jaws and provided at its rear end with a cam-face $3'$, a cam-ring 4 journaled on said shaft but held against endwise movement thereon and provided with a cam-face $4'$ corresponding to the cam-face on the said sleeve, and means for arresting the rotation of said cam-ring, substantially as described.

3. In a machine of the character described, the combination with a hollow shaft, of jaws 15 connected at their inner ends to said shaft and having beveled outer ends, springs 21 operating to throw said jaws outward, a sliding sleeve 3 splined on said shaft over the jaws and correspondingly beveled on its interior and provided at its rear end with a cam-face $3'$, a cam-ring 4 journaled on said shaft but held against endwise movement thereon and provided with a cam-face $4'$ corresponding to the cam-face on the said sleeve, means for arresting the rotation of said cam-ring, and coiled springs 22 arranged in longitudinal apertures in said sleeve and bearing against a shoulder on the shaft, substantially as described.

4. In a machine of the character described, the combination with a hollow shaft provided at one end with jaws 15 having beveled outer ends, springs 21 for throwing said jaws outward, a sliding sleeve 3 splined on said shaft over the jaws and correspondingly beveled on its interior and provided at its rear end with a cam-face $3'$, springs 22 for retracting said sleeve, a cam-ring 4 journaled on said shaft and having a cam-face $4'$ corresponding to the cam-face on the sleeve, a collar 7 fixed on the shaft in rear of the cam-ring, and means for arresting the rotation of the cam-ring, substantially as and for the purpose specified.

5. In a machine of the character described, the combination with a hollow shaft provided at one end with jaws 15 having beveled outer ends, springs 21 for throwing said jaws outward, a sliding sleeve 3 splined on said shaft over the jaws and correspondingly beveled on its interior and provided at its rear end with a cam-face $3'$, springs 22 for retracting said sleeve, a cam-ring 4 journaled on said shaft and having a cam-face $4'$ corresponding to the cam-face on the sleeve, a collar 6 fixed on the shaft in rear of the cam-ring, a collar 7 secured on the collar 6, a spring-washer 5 arranged between the collar 7 and the cam-ring, and means for arresting the rotation of the cam-ring, for the purpose specified.

6. In the machine of the character described, the combination with a rotary hollow shaft 2 provided at one end with jaws 15 having beveled outer ends, of springs 21 for throwing said jaws outward, a sliding sleeve 3 splined on said shaft over the jaws and correspondingly beveled on its interior and provided at its rear end with a cam-face 3', beveled projections 10 located on the periphery of said sleeve, springs 22 for retracting said sleeve, a cam-ring 4 journaled on said shaft and having a cam-face 4' corresponding to the cam-face on the sleeve, rectangular projections 9 located on the periphery of said cam-ring, a collar 7 fixed on the shaft in the rear of the cam-ring and provided on its periphery with beveled projections 8, and a shifting pivoted pawl 11 adapted for engagement with said projections, in the manner and for the purpose specified.

7. The combination with a rotary hollow shaft provided at one end with gripping-jaws 15 having beveled outer ends, a sliding sleeve 3 splined on said shaft over the jaws and correspondingly beveled on its interior and provided on its rear end with a cam-face 3', beveled projections 10 located on the periphery of said sleeve, springs 22 for retracting said sleeve, a cam-ring 4 journaled on said shaft and having a cam-face 4' corresponding to the cam-face on the sleeve, rectangular projections 9 located on the periphery of said cam-ring, a collar 7 fixed on the shaft in the rear of the cam-ring and provided on its periphery with beveled projections 8, a shaft 12 journaled and longitudinally movable in suitable bearings, and a pawl 11 fixed on said shaft and adapted for engagement with said projections, and a spring 14 for holding the pawl in engagement with said projections, substantially as described.

8. The combination with a hollow rotary shaft provided at one end with gripping-jaws 15 having beveled outer ends, a sliding sleeve 3 splined on said shaft over the jaws and correspondingly beveled on its interior and provided on its rear end with a cam-face 3', beveled projections 10 located on the periphery of said sleeve, springs 22 for retracting said sleeve, a cam-ring 4 journaled on said shaft and having a cam-face 4' corresponding to the cam-face on the sleeve, rectangular projections 9 located on the periphery of said cam-ring, a collar 7 fixed on the shaft in the rear of the cam-ring, beveled projections 8 located on the periphery of said collar, the said projections 10 and 8 having shanks pivoted in recesses in said sleeve and collar, springs $8^2$ arranged in said recesses on opposite sides of said shanks, and a shifting pawl 11 adapted for engagement with said projections, substantially as described and for the purpose specified.

9. The combination with a rotary hollow shaft provided at one end with gripping-jaws 15 having beveled outer ends, a sliding sleeve 3 splined on said shaft over the jaws and correspondingly beveled on its interior and provided on its rear end with a cam-face 3', beveled projections 10 located on the periphery of said sleeve, springs 22 for retracting said sleeve, a cam-ring 4 journaled on said shaft and having a cam-face 4' corresponding to the cam-face on the sleeve, rectangular projections 9 located on the periphery of said cam-ring, a longitudinally-adjustable collar 6 fixed on the shaft in rear of the cam-ring, a collar 7 axially adjustable on the collar 6 and provided on its periphery with beveled projections 8, and a shifting pivoted pawl 11, adapted for engagement with said projections, substantially as described.

10. In a machine of the class described, the combination with a hollow shaft, of jaws 15 connected at their inner ends to said shaft and having beveled bifurcated outer ends, radial gripping or threading dies movably secured in the bifurcated ends of said jaws, wedges 17 arranged between the outer ends of said dies and the peripheries of said jaws, screw-bolts 18 for operating said wedges to adjust the dies, a sliding sleeve 3 arranged over said jaws and correspondingly beveled upon its interior, and means for shifting said sleeve longitudinally to force the jaws inward, substantially as described.

In testimony whereof we have hereunto set our hands in presence of two subscribing witnesses.

WILLET C. WELLS.
FRANK E. WELLS.

Witnesses:
   JACOB M. SCHATZEL,
   GEORGE P. SCHATZEL.